(12) United States Patent
Shinke et al.

(10) Patent No.: US 7,616,391 B2
(45) Date of Patent: Nov. 10, 2009

(54) MULTIFUNCTIONAL OPTICAL DEVICE

(75) Inventors: Satoshi Shinke, Sakai (JP); Hiroji Katsuragi, Izumi (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 418 days.

(21) Appl. No.: 11/225,774

(22) Filed: Sep. 13, 2005

(65) Prior Publication Data

US 2006/0056795 A1  Mar. 16, 2006

(30) Foreign Application Priority Data

Sep. 16, 2004  (JP) .............................. 2004-269488

(51) Int. Cl.
G02B 7/02 (2006.01)

(52) U.S. Cl. ....................... 359/813; 359/819; 359/821; 359/822

(58) Field of Classification Search ................. 359/811, 359/813, 819, 821, 822, 823, 921
See application file for complete search history.

(56) References Cited

U.S. PATENT DOCUMENTS

| 5,589,723 | A | | 12/1996 | Yoshida et al. |
|---|---|---|---|---|
| 5,828,453 | A | * | 10/1998 | Yamamoto et al. .......... 356/515 |
| 5,937,215 | A | * | 8/1999 | Mogamiya .................... 396/85 |
| 5,966,248 | A | * | 10/1999 | Kurokawa et al. .......... 359/697 |
| 6,249,093 | B1 | | 6/2001 | Takahata et al. |
| 6,813,234 | B2 | * | 11/2004 | Togashi et al. ......... 369/112.02 |
| 2006/0244940 | A1 | * | 11/2006 | Uehara ........................ 355/69 |

FOREIGN PATENT DOCUMENTS

| JP | 08-315409 (A) | 11/1996 |
|---|---|---|
| JP | 09-138956 (A) | 5/1997 |
| JP | 09-167377 (A) | 6/1997 |
| JP | 2005-018949 (A) | 1/2005 |

* cited by examiner

*Primary Examiner*—Ricky L Mack
*Assistant Examiner*—Brandi N Thomas
(74) *Attorney, Agent, or Firm*—Sidley Austin LLP

(57) ABSTRACT

There is provided optical devices capable of performing aberration corrections with high accuracy for light rays having plural wavelengths with a simple structure without involving a cost increase.

An optical device 1 includes an actuator 8 for driving an optical member 40 in the direction of an optical axis and a guide member 46 for guiding the optical member 40 being driven. The optical member 40 includes plural functional portions 42 and 44 having different functions, and the optical axes of the respective functional portions 42 and 44 of the optical member 40 are brought into coincidence with a light ray through the guiding of the guide member 46.

12 Claims, 11 Drawing Sheets

← returning direction    proceeding direction →

MULTIFUNCTIONAL OPTICAL DEVICE

The present application claims priority to Japanese Patent Application No. 2004-269488 filed on Sep. 16, 2004, the entire contents of which are hereby incorporated by reference.

BACKGROUND OF THE INVENTION

1. Field of the Invention

The present invention relates to multifunctional optical devices capable of switching among plural functions with an actuator, and more particularly to pickup devices for performing writing/reading onto or from plural optical disks such as CDs or DVDs.

2. Description of the Related Art

In recent years, an optical device 100 as illustrated in FIG. 10 has been employed in optical pickup devices for CDs or DVDs. The optical device 100 includes a rectangular-shaped base member 102. A fixed-lens holding wall 106 which holds a fixed lens 104 is stood up from a single edge portion of the base member 102.

On the fixed-lens holding wall 106, there is secured a weight 110 of a piezoelectric actuator 108, wherein the weight 110 has, for example, a cylindrical shape. The piezoelectric actuator 108 is constituted by the aforementioned weight 110, a piezoelectric device 112, which is an electromechanical transducer secured to the weight 110 at its one end in the direction of extension and contraction, and a driving shaft 114 having, for example, a round-bar shape which is secured to the other end of the piezoelectric device 112 in the direction of extension and contraction. The driving shaft 114 is slidably supported by being passed through supporting walls 106 and 118 which are stood up from the base member 102 such that they are spaced apart from each other by a predetermined distance. The piezoelectric device 108 extends or contracts when a voltage is applied thereto from a driving circuit which is not illustrated.

The optical device 100 includes a movable member 122 holding a movable lens 120. A wedge-shaped cutout portion 124 is formed at one end of the movable member 122, and the cutout portion 124 is engaged with the outer peripheral surface of the driving shaft 114 of the piezoelectric actuator 108. A frictional member 126 is provided to pinch the driving shaft 114 in cooperation with the cutout portion 124 of the movable member 122. The frictional member 126 is coupled to the movable member 122 through an elastic member such as a coil spring or a flat spring which is not illustrated. Thus, the movable member 122 is biased toward the driving shaft 114 through the biasing force of the elastic member, thereby frictionally engaging with the driving shaft 114 with a predetermined frictional force.

A U-shaped cutout portion 128 is formed at the end portion of the movable member 122 which is opposite from the cutout portion 124, with the movable lens 120 positioning therebetween. A straight restricting member 130 having a round-bar shape, for example, is loosely fit in the cutout 128. The restricting member 130 is secured to the fixed-lens holding wall 106 and a guide-member supporting wall 132 at the both end portions thereof in parallel with the driving shaft 114 of the piezoelectric actuator 108. Since the restricting member 130 is fit in the cutout portion 128, the movable member 122 is restrained from rotating about the driving shaft 114 of the piezoelectric actuator 108.

In the optical device 100 having the aforementioned configuration, the movable member 122 is driven along the optical axis by the piezoelectric actuator 108 at the state where the optical axis of the movable lens 120 is always in coincidence with the optical axis L of the fixed lens 104.

Subsequently, the principle of the driving of the piezoelectric actuator 108 will be described. FIG. 11 illustrates respective states of when the piezoelectric device 112 extends and contracts a single time. For example, a triangular-waveform pulse voltage having mild rising-up portions and steep falling-down portions is applied to the piezoelectric device 112, the piezoelectric device 112 repeats slow extension and rapid contraction and thus oscillates.

FIG. 12 illustrates the displacement of the driving shaft 114 of when the piezoelectric device 112 repeatedly extends and contracts. This shaft displacement is generated along a so-called sawtooth profile having mild rising-up portions and rapid falling-down portions, wherein the respective states D, E and F correspond to the states D, E and F in FIG. 11. Assuming that the state D is an initial state, when the piezoelectric device 112 slowly extends, the driving shaft 114 and the movable member 122 which are frictionally engaged with each other are displaced together to the state E at a relatively low velocity. Subsequently, when the piezoelectric device 112 rapidly contracts, the displacement of the driving shaft 114 is restored to the original position at a relatively high velocity, which generates slippage between the movable member 122 and the driving shaft 114, thus causing the movable member 122 to slightly return and reach the state F. At the state F, the position of the movable member 122 has been slightly displaced in the direction of proceeding (namely, in the direction away from the piezoelectric device 112). Since the aforementioned extension and contraction of the piezoelectric device 112 are repeated, the movable member 122 is driven in the direction of proceeding along the driving shaft 114.

On the other hand, the movable member 122 is driven in the direction of returning (namely, in the direction towards the piezoelectric device 112) along the driving shaft 114 on the principle opposite to the aforementioned principle. Namely, when the piezoelectric device 112 repeats rapid extension and slow contraction, the displacement of the driving shaft 114 occurs along a sawtooth profile having steep rising-up portions and mild falling-down portions, on the contrary to that illustrated in FIG. 12. Thus, when the piezoelectric device 112 rapidly extends, slippage is generated between the movable member 122 and the driving shaft 114 while when the piezoelectric device 112 slowly contracts, the movable member 122 and the driving shaft 114 are displaced together in the direction of returning. Since this is repeated, the movable member 122 is moved in the direction of returning.

In a CD/DVD optical pickup device employing the aforementioned optical device 100, the movable lens 120 can be positioned at plural predetermined positions within the range of the driving stroke of the movable member 122 to perform aberration corrections for a laser having plural wavelengths, which enables coping with plural recording mediums with a single optical system.

For example, in FIG. 10, the movable member 122 is finely positioned near the position of the arrow A to perform aberration corrections for a blue DVD laser, the movable member 122 is finely positioned near the position of the arrow B to perform aberration corrections for a red DVD laser and the movable member 122 is finely positioned near the position of the arrow C to perform aberration corrections for a CD laser.

However, as miniaturization and accuracy improvement of optical pickup devices have been advanced, it has increasingly become difficult to perform aberration corrections for a laser having plural wavelengths with a single optical device.

Namely, with advancing miniaturization of optical systems, the tolerances which can secure the optical performance have been reduced below the manufacturing tolerances of conventional optical systems and the assembling tolerances of optical devices. Therefore, there has been a need for establishment of new manufacturing methods and new assembling methods. In order to establish such new methods, enormous amounts of investments are required. Furthermore, even if such methods can be established, the cost of optical devices will be unavoidably increased.

Therefore, it is an object of the present invention to provide optical devices which enable performing aberration corrections with high accuracy for light rays having plural wavelengths, in a simple configuration where no cost increases.

SUMMARY OF THE INVENTION

It is a main object of the present invention to provide multifunctional optical devices capable of switching among plural functions using an actuator.

It is another object of the present invention to provide optical devices capable of switching among plural lenses in accordance with the application, using an actuator which performs driving in the direction of an optical axis.

It is a further object of the present invention to provide optical devices capable of easily switching among aberration-correcting members suitable for different wavelengths.

It is a further object of the present invention to provide multifunctional optical devices capable of switching among optical axes, using a guide member and an actuator for driving an optical member having plural optical axes in the direction of an optical axis.

According to an aspect of the present invention, there is provided an optical device including an optical member having plural functional portions, an actuator for driving the aforementioned optical member in the direction of the optical axis of the optical device and a guide member for guiding the aforementioned optical member, wherein the respective functional portions of the aforementioned optical member are set on the optical axis of the optical device through the guiding with the aforementioned guide member.

With this optical device, since the plural functional portions having different functions provided on the optical member are set on the optical axis of the optical device by guiding the optical device with the guiding member, aberration corrections and so on can be performed with high accuracy through the respective functional portions suitable for applications. Further, a conventional restricting member may be utilized as the guide member, thus involving no cost increase.

Further, preferably, the optical member is rotatably held and the plural functional portions are placed along an arc. This enables switching among the plural functions portion through the rotation of the optical member, thus enabling simplifying the switching mechanism and easily improving the accuracy of the switching position.

Also, the optical member may includes plural lenses arranged on a plate member.

Also, the plural functional portions may be in a single optical member having different functions and an optical axis. This enables switching among the different functions of the single optical device with a simple device.

Further, the plural functional portions may be in plural optical members having respective optical axes and different functions. This enables integrating the plural optical members, which facilitates the adjustment and the assembly of the optical members and also reduces the storage space.

Further, the plural functional portions may be plural aberration-correcting members suitable for different wavelengths. This enables switching among the aberration-correcting members in accordance with the wavelength to be used, thus enabling optimum aberration corrections and simplifying the switching mechanism.

Also, the plural functional portions may be plural wavefront-correcting members suitable for different objects. This enables performing optimum aberration corrections in accordance with the position of light-condensing (the distance of actuation) and the used medium (the type of the optical disk) and also enables simplifying the switching mechanism.

Further, another actuator for driving the guide member may be provided. This can increase the flexibility of the design of the driving range of the guide member and also can optimize the driving force.

Also, the guide member may have a discontinuous portion and, within the driving range of the optical member, the guiding of the optical member by the guide member is released at the position associated with the discontinuous portion.

Further, the actuator may include the aforementioned driving shaft, an electro-mechanical transducer which extends or contracts when a voltage is applied thereto, the electro-mechanical transducer being secured to the end portion of the driving shaft at its one end in the direction of extension and contraction, and a movable member which is engaged with the driving shaft with a frictional force, wherein the movable member is moved along the driving shaft when the electro-mechanical transducer extends or contracts to displace the driving shaft. The movable member may be either an optical member or a member coupled to an optical member. The electro-mechanical transducer is capable of generating displacement with high accuracy and high resolution even though it has a compact size. This configuration utilizing frictional engagement enables smooth driving with high accuracy. Therefore, this configuration is suitable for accurate adjustments of optical systems.

Further, preferably, the plural functional portions are placed along an arc centered on the driving shaft.

Further, the driving shaft may also serve as the guide member. This eliminates the necessity of the guide member, thus enabling configuration with a lower cost.

According to another aspect of the present invention, there is provided an optical device including an optical member having a single functional portion, an actuator for driving the aforementioned optical member in the direction of the optical axis of the optical device and a guide member for guiding the aforementioned optical member, wherein the functional portion is brought into coincidence with plural optical axes of the optical device through the guiding by the aforementioned guide member.

With this optical device, since the optical axis of the single functional portion provided on the optical member is brought into coincidence with the plural optical axes of the optical device by guiding the optical member with the guide member, aberration corrections can be performed with high accuracy at the positions of the optical axes of the optical member for plural light rays having different wavelengths. Further, the driving shaft of a conventional actuator may be utilized as the guide member, thus involving no cost increase.

The invention itself, together with further objects and attendant advantages, will best be understood by reference to the following detailed description taken in conjunction with the accompanying drawings.

BRIEF DESCRIPTION OF THE DRAWINGS

FIG. 2 is views illustrating an optical member of the optical device according to the present invention, wherein FIG. 2A illustrates the optical member being positioned at a first position while

In the following description, like parts are designated by like reference numbers throughout the several drawings.

DETAILED DESCRIPTION OF THE PREFERRED EMBODIMENTS

There will be described optical devices according to the present invention hereinafter. However, the present invention is not limited to these embodiments.

Figure 1:
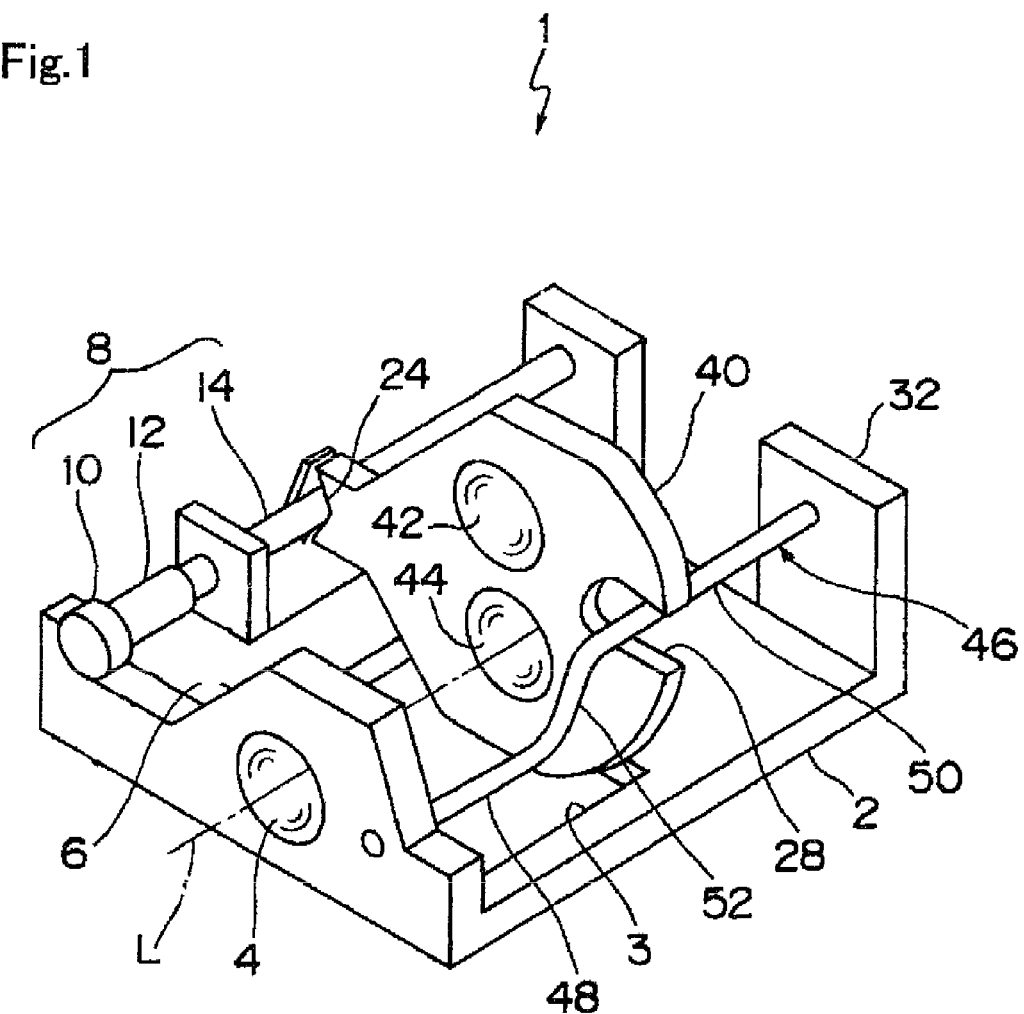
FIG. 1 is a view illustrating an optical device according to a first embodiment of the present invention.

FIG. 1 is a perspective view of an optical device 1 according to a first embodiment of the present invention. The optical device 1 is structured substantially similarly to the optical device 100 described previously as the prior art and, therefore, the same components as those of the optical device 100 will be designated by the reference numerals for those of the optical device 100 subtracted by 100. Further, detailed description of the same components will be omitted.

The optical device 1 includes a substantially sector-shaped movable member (optical member) 40 having a wedge-shaped cutout portion 24 and a U-shaped cutout portion 28 at the both end portions thereof. The movable member 40 constitutes a portion of an actuator 8, in cooperation with a weight 10, a piezoelectric device 12 and a driving shaft 14. The movable member 40 holds a first movable lens (functional portion) 42 and a second movable lens (functional portion) 44 which, for example, have different functions such as different refractive indexes. The first movable lens 42 and the second movable lens 44 are placed such that their optical axes are positioned on the same arc centered on the driving shaft 14.

Further, the optical device 1 includes a guide member 46 having, for example, a round-bar shape, in stead of the restricting member 130 of the aforementioned optical device 100. The guide member 46 is loosely fit in the U-shaped cutout portion 28 of the movable member 40. The guide member 46 is constituted by a first straight portion 48 and a second straight portion 50 positioned at the opposite end portions thereof and a curved portion 52 which connects them to each other in a smoothly-curved line shape. The first straight portion 48 and the second straight portion 50 are parallel with the driving shaft 14 of the actuator 8 respectively, and are displaced from each other, for example, vertically when viewed along the optical axis of a fixed lens 4.

Figure 2A:
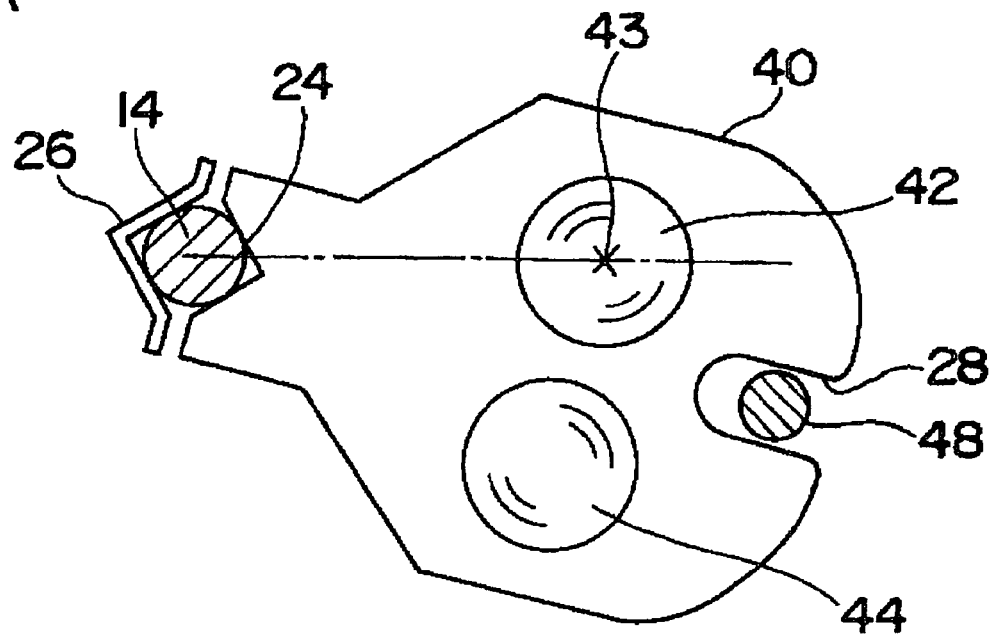

Since the guide member 46 has the aforementioned configuration, when the movable member 40 is driven by the actuator 8 along the driving shaft 14, the movable member 40 is guided by the guide member 46 such that it rotates about the driving shaft 14. More specifically, when the movable member 40 is guided by the first straight portion 48 of the guide member 46, the movable member 40 is placed at a first position at which the optical axis 43 of the first movable lens 42 is coincident with the optical axis L of the fixed lens 4, as illustrated in FIG. 2A. Further, in order to prevent the interference between the movable member 40 being at the first position and a base member 2, the base member 2 is provided with a rectangular-shaped opening portion 3.

Figure 2B:
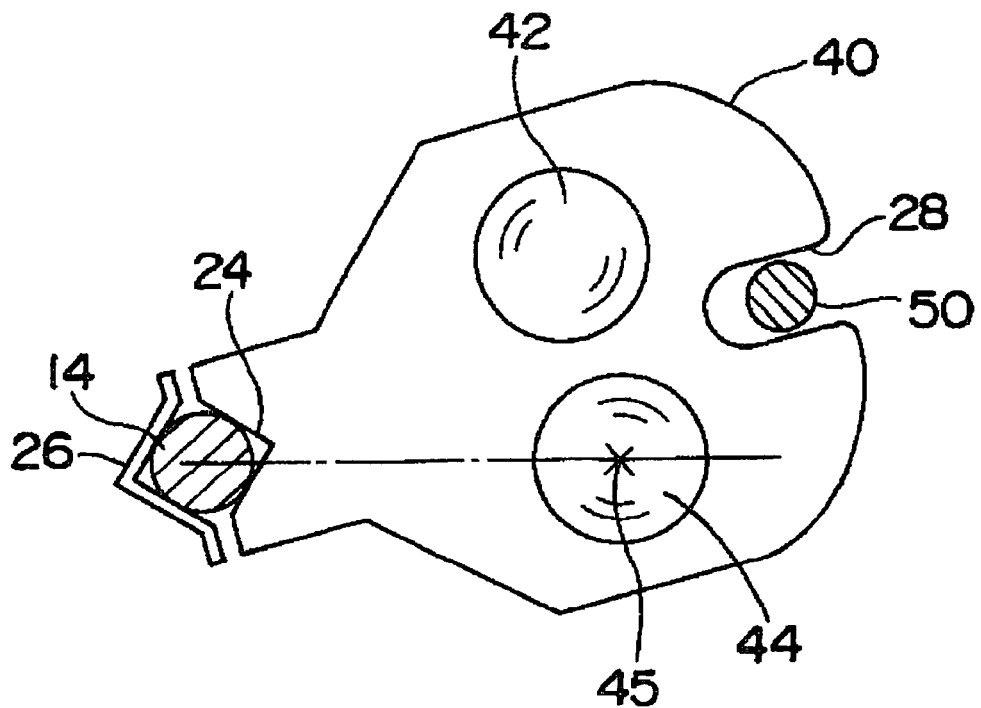
FIG. 2B illustrates the optical member being positioned at a second position.

On the other hand, when the movable member 40 being at the first position is driven in the direction of proceeding along the driving shaft 14 by the actuator 8, the movable member 40 gets to be guided by the second straight portion 50 after passing the first straight portion 48 and the curved portion 52 of the guide member 46. At this time, when the movable member 40 is guided by the curved portion 52 of the guide member 46, the movable member 40 is rotated about the driving shaft 14 to reach a second position as illustrated in FIG. 2B. At the second position, the optical axis 45 of the second movable lens 44 is coincident with the optical axis L of the fixed lens 4.

Further, while in the optical device 1 according to the present embodiment the optical member holding the lenses 42 and 44 forms the movable member 40, the optical member holding the lenses may be coupled to a movable member which is driven by the actuator 8.

Subsequently, the operation of the optical device 1 having the aforementioned configuration will be described. The principle of the driving of the movable member 40 using the actuator 8 is identical to that of the optical device 100 described above as the prior art. Namely, when a triangular-waveform pulse voltage having mild rising-up portions and steep falling-down portions is applied to the piezoelectric device 12, the piezoelectric device 12 repeats slow extension and rapid contraction and thus oscillates. At this time, the driving shaft 14 is displaced along a so-called sawtooth profile having a mild rising-up portion and a steep falling-down portion. When the piezoelectric device 12 slowly extends, the driving shaft 14 and the movable member 40 which frictionally engages therewith are displaced together in the direction of proceeding at a relatively low velocity. Subsequently, when the piezoelectric device 12 rapidly contracts, the displacement of the driving shaft 14 is restored to the original position at a relatively high velocity, which causes slippage between the movable member 40 and the driving shaft 14, thus causing slight return of the movable member 40. At this state, the position of the movable member 40 has been slightly displaced in the direction of proceeding from the initial state. Since the extension and contraction of the piezoelectric device 12 are repeated, the movable member 40 is driven in the direction of proceeding along the driving shaft 14.

On the other hand, the movable member 40 is driven in the direction of returning along the driving shaft 14 in the opposite principle to that described above. Namely, when the piezoelectric device 12 repeats rapid extension and slow contraction, the driving shat 14 is displaced along a sawtooth profile having a steep rising-up portion and a mild falling-down portion. Thus, when the piezoelectric device 12 rapidly extends, slippage is generated between the movable member 40 and the driving shaft 14 while when the piezoelectric device 12 slowly contracts the movable member 40 is displaced together with the driving shaft 14 in the direction of returning. Since this is repeated, the movable member 40 is driven in the direction of returning.

Figure 3:
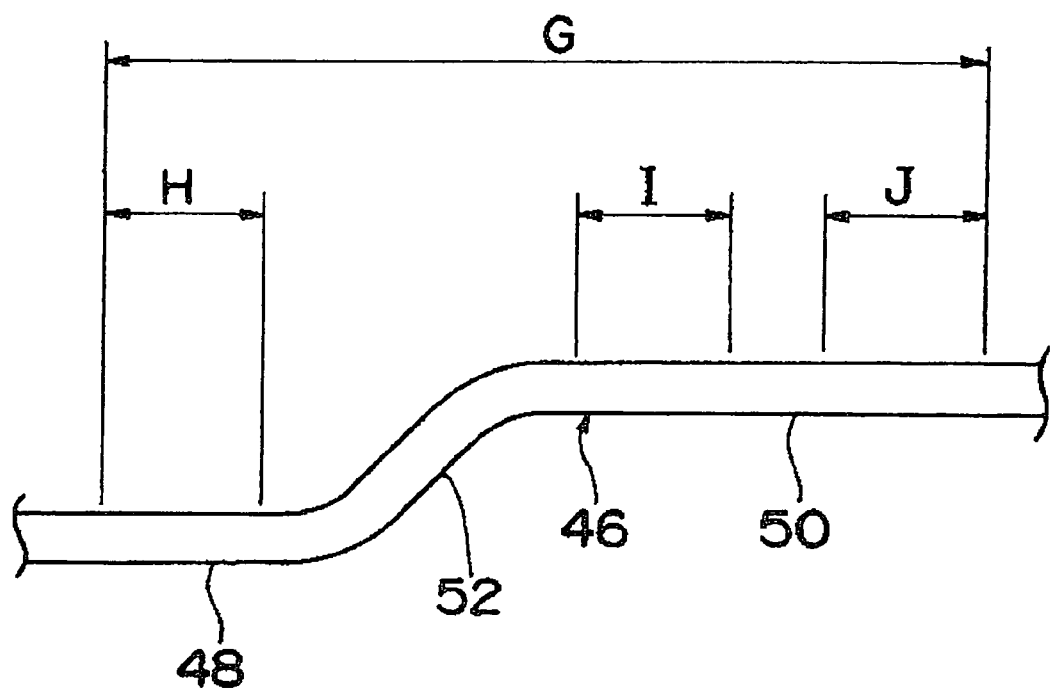
FIG. 3 is a view illustrating a guide member of the optical device according to the present invention.

As described above, the movable member 40 is driven over the range G of the driving stroke while being guided by the guide member 46 as illustrated in FIG. 3. Within the range H out of the range G, the movable member 40 is guided by the first straight portion 48 of the guide member 46 and thus is placed at the first position (see FIG. 2A). At the first position, the first movable lens 42 is coincident with the light ray and, since the movable member 40 is adjusted and positioned within the range H at this state, for example, aberration corrections are performed for a blue DVD laser light ray through the fixed lens 4 and the first movable lens 42.

Further, within the ranges I and J out of the range G of the driving stroke of the movable member 40, the movable member 40 is guided by the second straight position 50 and thus is positioned at the second position (see FIG. 2B). At the second position, the second movable lens 44 is coincident with the light ray and, when the movable member 40 is positioned and adjusted within the range I at this state, for example, aberration corrections are performed for a red DVD laser light ray through the fixed lens 4 and the second movable lens 44 while, when the movable member 40 is positioned and adjusted within the range J, for example, aberration corrections are performed for a CD laser light ray through the fixed lens 4 and the second movable lens 44.

As described above, with the optical device 1 according to the present embodiment, since the two lenses 42 and 44 having different functions provided on the movable member 40 are individually brought into coincidence with the light ray by guiding the movable member 40 through the guide member 46, aberration corrections can be performed with high accuracy for plural light rays having different wavelengths using a suitable lens. Further, the conventional restricting member 130 may be employed as the guide member 46 only by deforming it, thus involving no cost increase.

Figure 4:
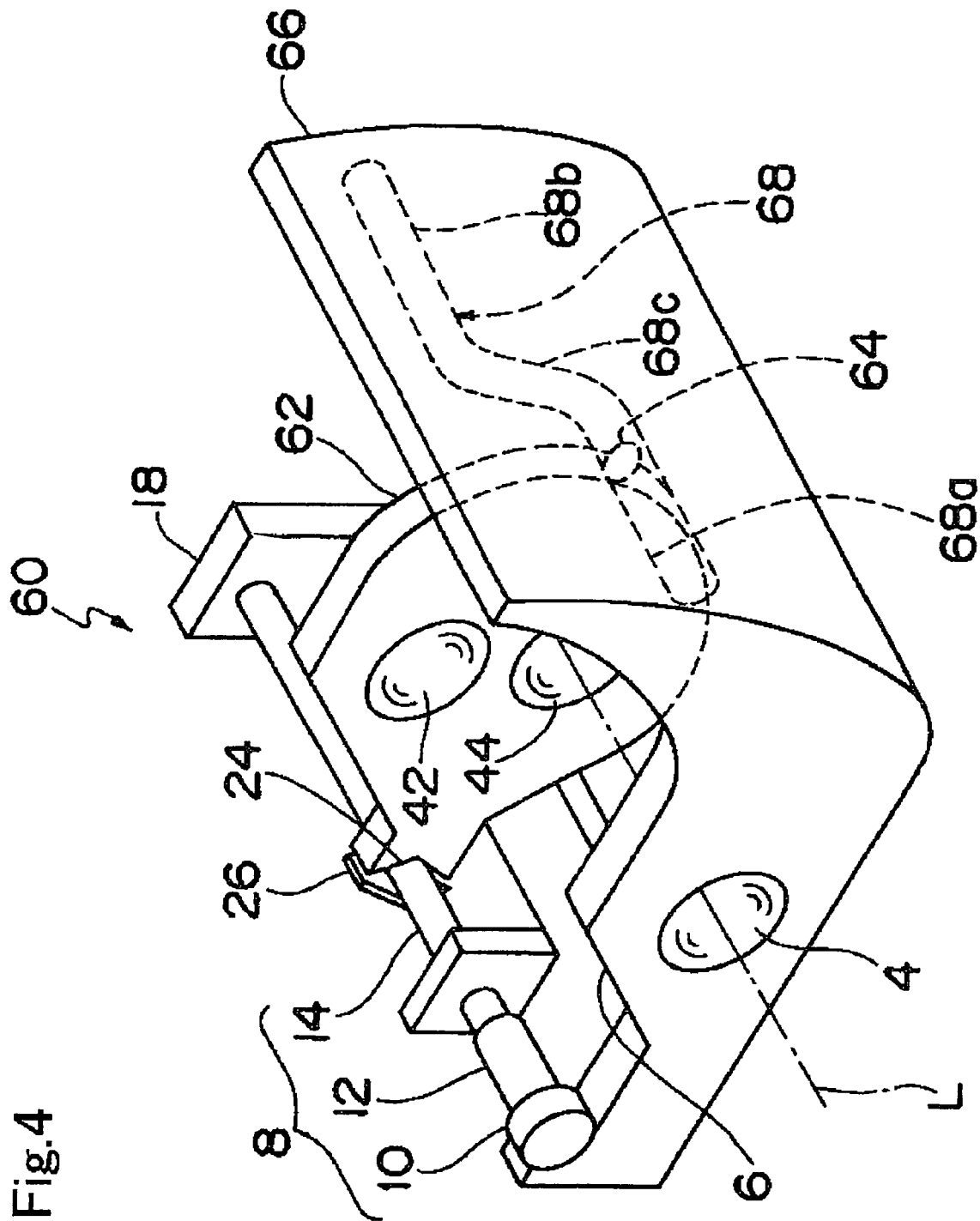
FIG. 4 is a view illustrating an optical device according to a second embodiment of the present invention.

Next, a second embodiment of the optical device 1 will be described. FIG. 4 illustrates an optical device 60 according to the second embodiment. In the optical device 60, a guide pin 64 is protruded from the tip end portion of a movable member 62. Further, on the inner surface of a side wall 66 extended from the base member 2 to cover the side portion of the movable member 62, there is formed a guide groove 68 constituted by a first straight groove 68a, a second straight groove 68b and a curved groove 68c. The guide pin 64 is engaged with the guide groove 68 and, when the guide pin 64 is moved along the guide groove 68, the movable member 62 is guided such that it rotates about the driving shaft 14. The other configurations and operations are similar to those of the aforementioned optical device 1 and description thereof is omitted.

Figure 5:
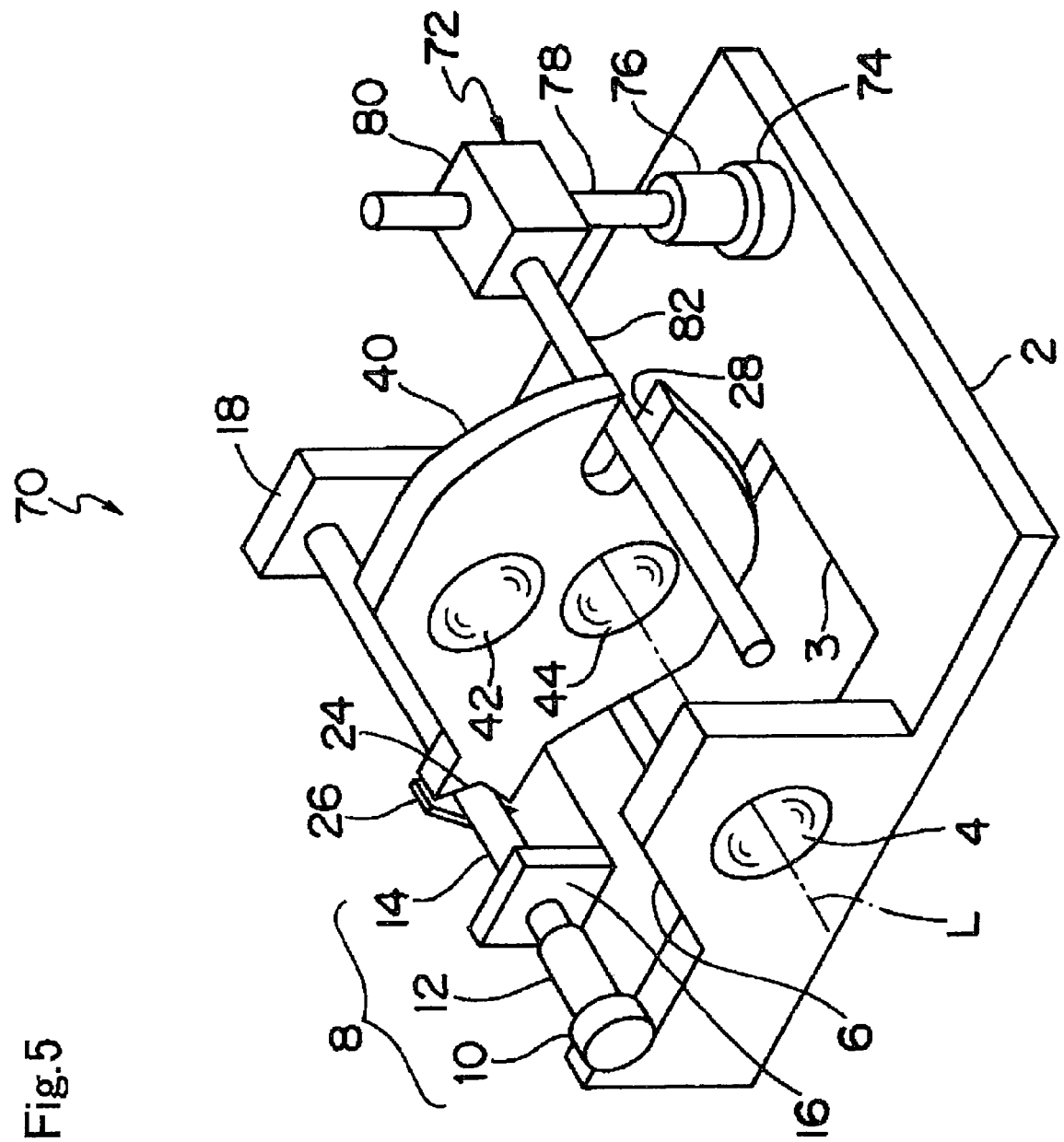
FIG. 5 is a view illustrating an optical device according to a third embodiment of the present invention.

Next, with reference to FIG. 5, an optical device 70 according to a third embodiment will be described in terms of differences from the aforementioned optical device 1. In the optical device 70, another actuator 72 is provided on the base member 2, in addition to the actuator 8 used for driving the movable member 40. The actuator 72 is constituted by a weight 74 secured on the base member 2, a piezoelectric device 76 which is secured on the weight 74 at its one end portion in the direction of extension and contraction, a round-bar shaped driving shaft 78, for example, which is secured to the other end portion of the piezoelectric device 76 in the direction of extension and contraction, and a moving member 80 which frictionally engages with the driving shaft 78. A guide member 82 having, for example, a straight round-bar shape is coupled to the moving member 80 and the guide member 82 is loosely fit in the U-shaped cutout portion 28 of the movable member 40.

In the aforementioned optical device 70, the driving shaft 78 of the actuator 72 is extended in the direction substantially perpendicular to the direction of driving by the actuator 8. Consequently, when the actuator 72 is driven with a predetermined timing to move the moving body 80 along the driving shaft 78, the height of the guide member 82 from the base member 2 is changed, thus guiding the movable member 40 to the first position or the second position.

Figure 6A:
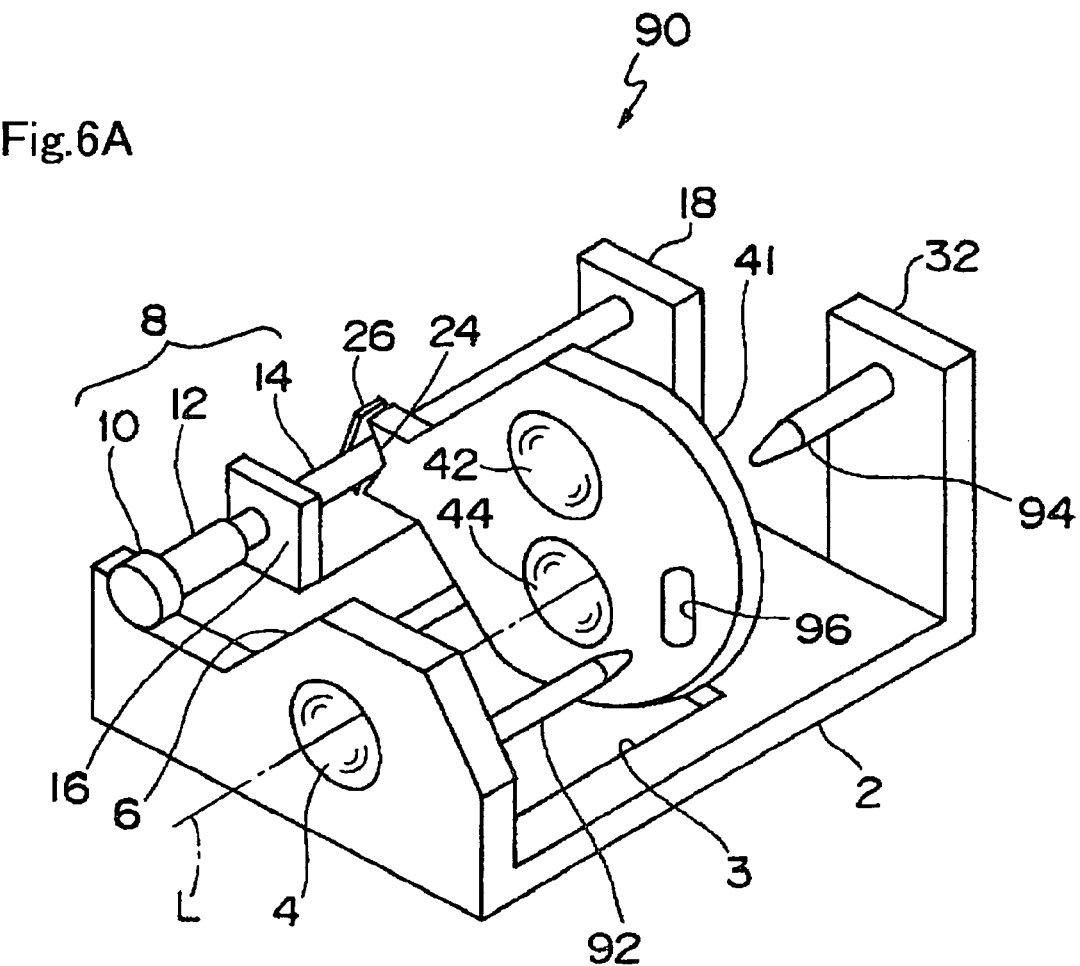
FIG. 6 is a view illustrating an optical device according to a fourth embodiment of the present invention.

Next, with reference to FIG. 6, an optical device 90 according to a fourth embodiment will be described in terms of differences from the aforementioned optical device 1. In the optical device 90, as illustrated in FIG. 6A, while there are provided a first straight guide member 92 corresponding to the first straight portion 48 of the aforementioned guide member 46 and a second straight guide portion 94 corresponding to the second straight portion 50 of the aforementioned guide member 46, there is not provided a portion corresponding to the curved portion 52 of the aforementioned guide member 46, and a discontinuous portion is formed. The first straight guide member 92 and the second straight guide member 94 are steepled at their tip end portions which are faced to the movable member 41.

Figure 6B:
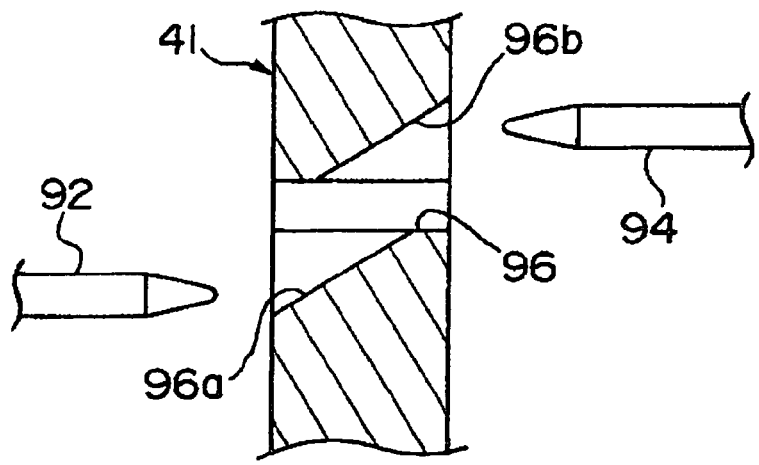

On the other hand, a guide hole 96 is formed in the movable member 41. The guide hole 96 is expanded with an inclined surface 96a at the side facing to the first straight guide member 92 and is expanded with an inclined surface 96b at the side facing to the second guide member 94, as illustrated in FIG. 6B.

With the aforementioned optical device 90, when the movable member 41 is driven in the direction of returning by the actuator 8, the first straight guide member 92 is inserted into the guide hole 96 while being guided by the inclined surface 96a, so that the movable member 41 is positioned at the first position. On the other hand, when the movable member 41 is driven in the direction of proceeding by the actuator 8, the second straight guide member 94 is inserted into the guide hole 96 while being guided by the inclined surface 96b, so that the movable member 41 is positioned at the second position.

Further, although the guiding of the movable member 41 is temporarily released over the position corresponding to the discontinuous portion between the first straight guide member 92 and the second straight guide member 94, it is only necessary to restrict the rotation of the movable member 41 in some way for preventing the movable member 41 from largely rotating about the driving shaft 14 during the release of guiding.

Figure 7A:
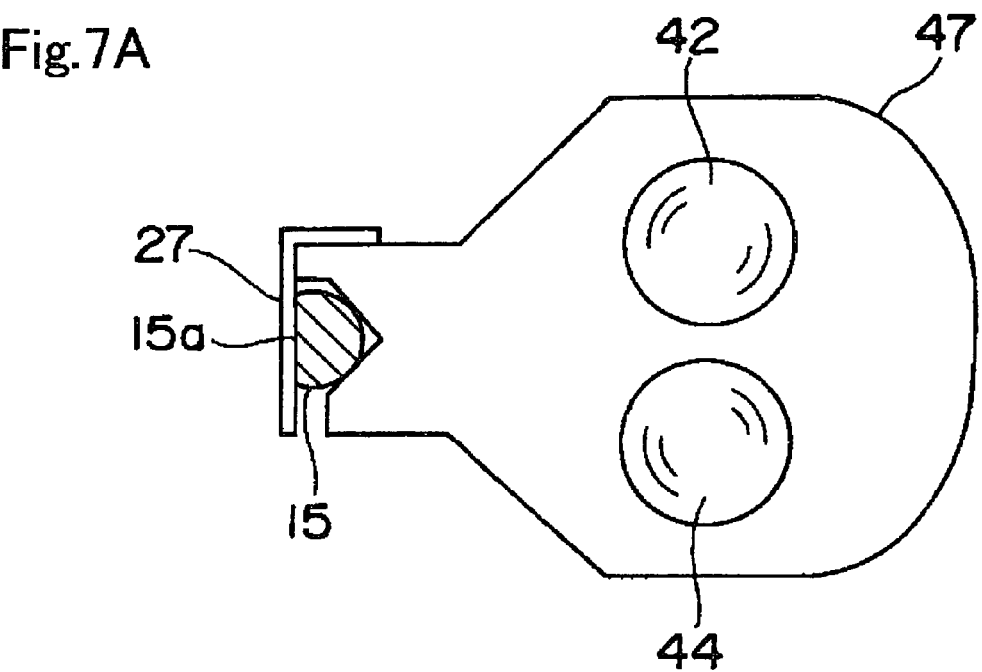
FIG. 7 is a cross sectional view and a perspective view of a driving shaft of an optical device according to a fifth embodiment of the present invention.
Figure 7B:
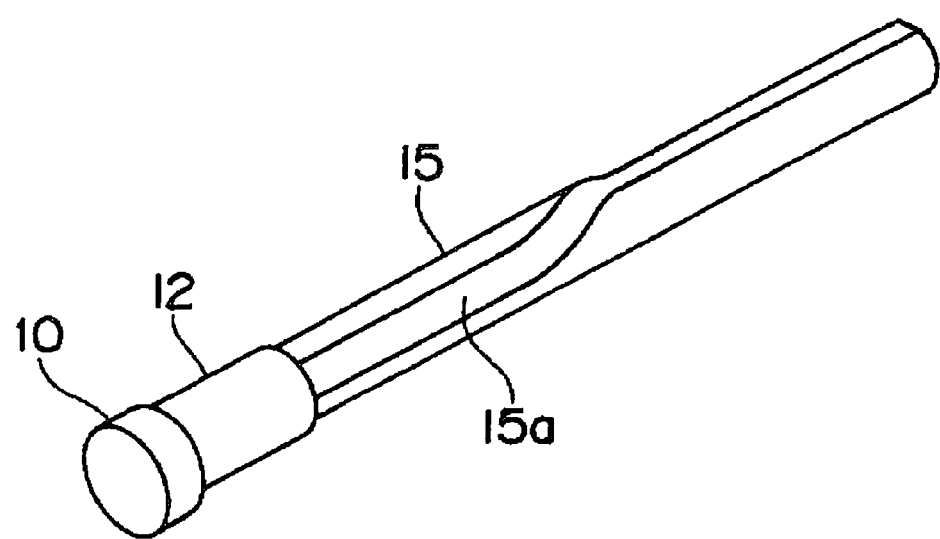

Next, with reference to FIG. 7, a fifth embodiment will be described in terms of differences from the aforementioned optical device 1. According to the fifth embodiment, the guide member 46 and the U-shaped cutout portion 28 of the optical device 1 are not provided, and the driving shaft 15 of the actuator 8 also serves as a guide member for guiding the movable member 47.

More specifically, a cut surface 15a is formed on the outer peripheral surface of the driving shaft 15 such that the driving shaft 15 has a D-shaped cross sectional area. The cut surface 15a is extended straightly from the side of the driving shaft 15 closer to the piezoelectric device 12, inclined at the middle position of the driving shaft 15 such that the circumferential position thereof is displaced and then is extended straightly again to the tip end portion of the driving shaft 15. A flat-plate shaped frictional member 27 is coupled to the movable member 47 at the state where the frictional member 27 is compressively pressed against the cut surface 15a of the driving shaft 15 with a predetermined biasing force.

With this configuration, when the movable member 47 is driven along the driving shaft 15, the movable member 47 is guided such that it rotates about the driving shaft 15 since it is moved under the condition where the frictional member 27 is always compressively pressed against the cut surface 15a of the driving shaft 15.

Further, in the fifth embodiment, the guide member 46 of the optical device 1 may be utilized in conjunction therewith.

The present invention is not limited to the aforementioned embodiments and various variations and modifications may be made.

While, in the aforementioned optical device 1 and the like, the movable member 40 is guided by the guide member 46 for switching between the two lenses 42 and 44, the guide member may be configured to switch among three or more lenses, for example.

Figure 8:
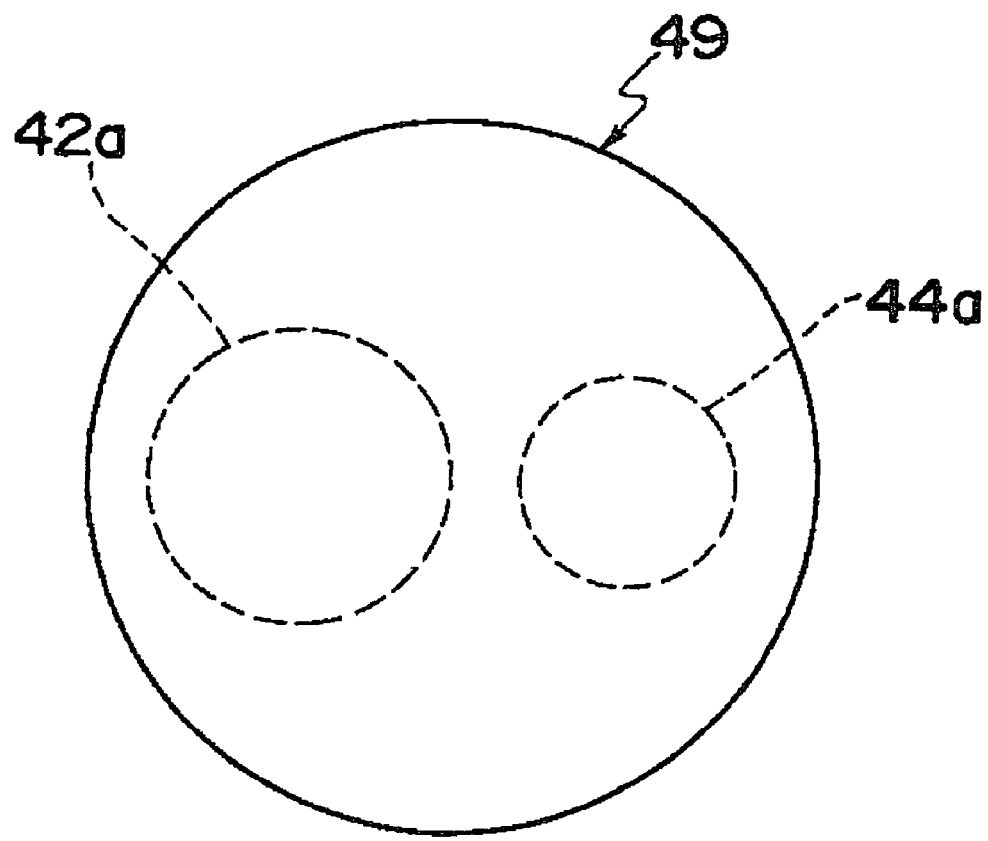
FIG. 8 is a view illustrating a single optical member provided with two lens portions, according to the present invention.

Also, as illustrated in FIG. 8, the movable member may be a single lens 49 including two lens portions (functional portions) 42a and 44a having different functions such as different refractive indexes, for example, and the movable member 40 may be guided by the guide member 46 to switch between these lens portions 42a and 44a.

Figure 9:
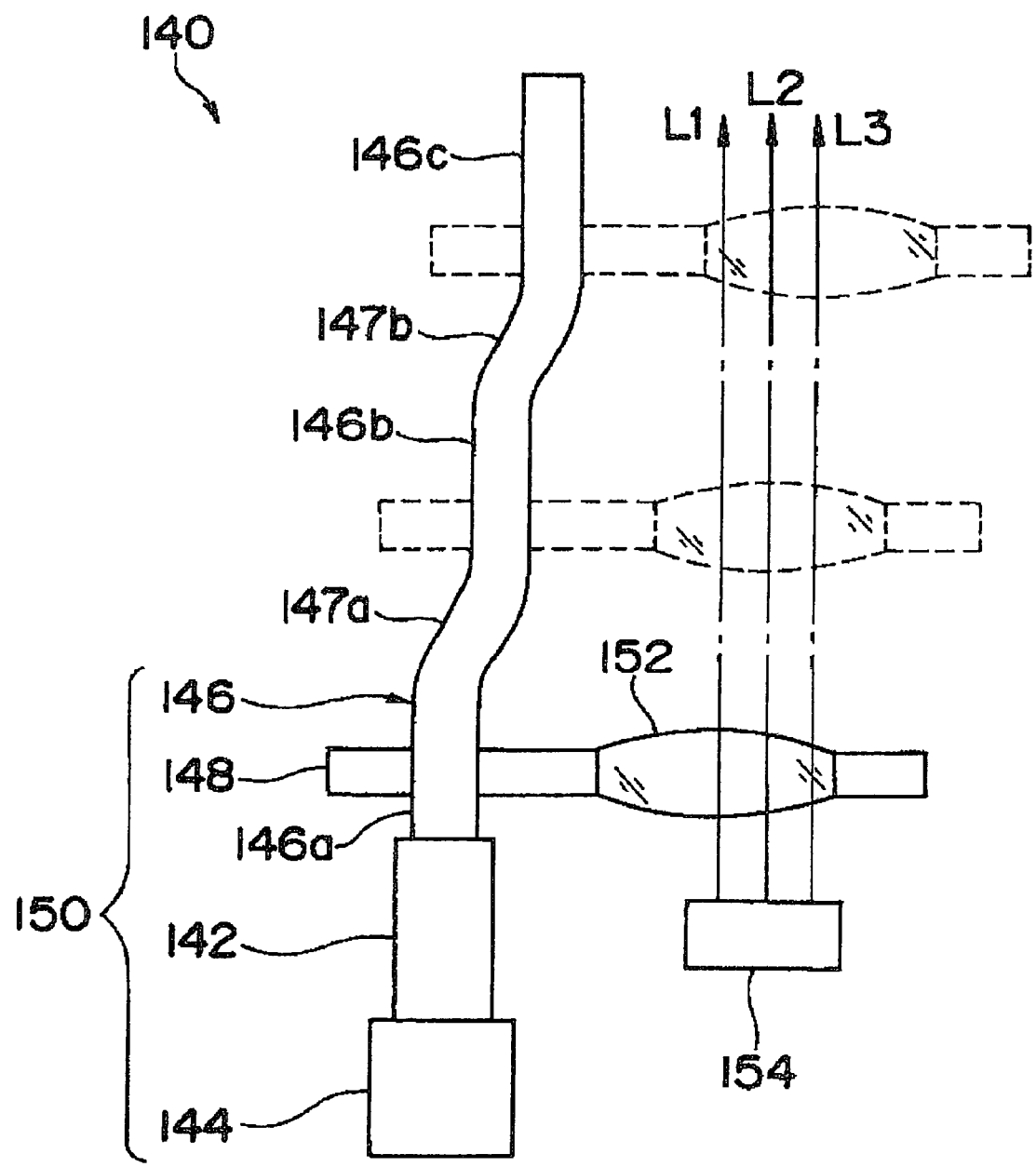
FIG. 9 is a partial schematic view illustrating an optical device according to a sixth embodiment of the present invention.
Figure 10:
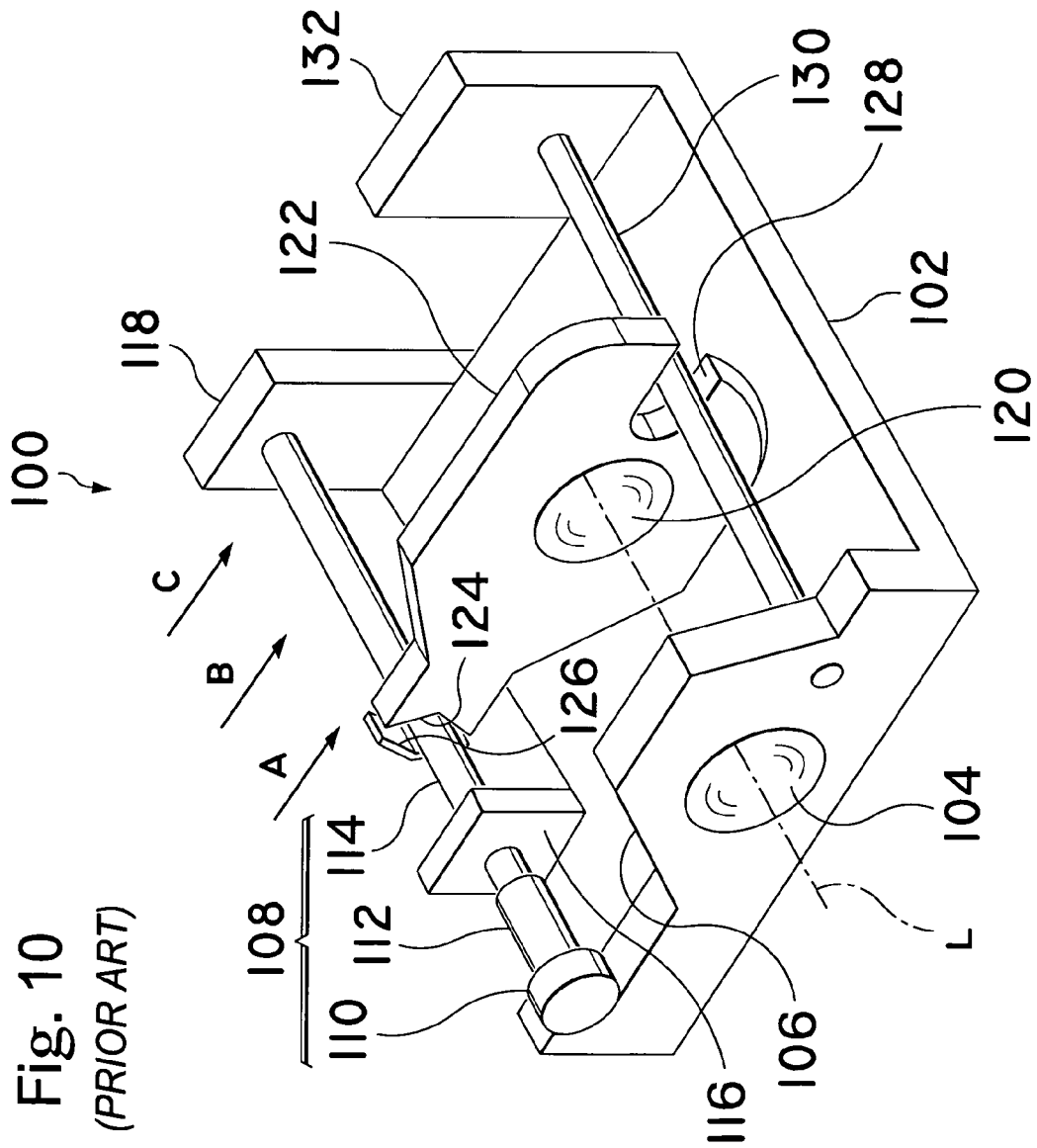
FIG. 10 is a perspective view of a conventional optical device.
Figure 11:
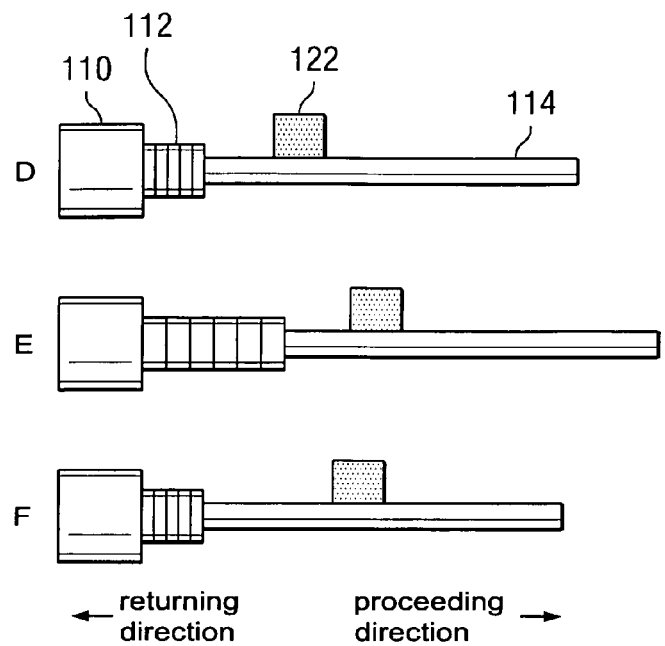
FIG. 11 is a view illustrating the principle of the driving by the actuator used in the present embodiment.
Figure 12:
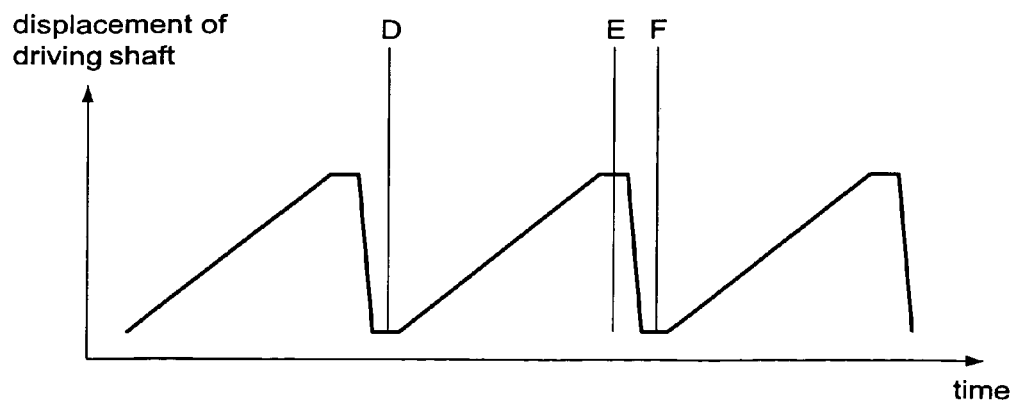
FIG. 12 is a view illustrating the displacement of the driving shaft of the actuator used in the present embodiment.

Next, an optical device 140 according to a sixth embodiment will be described with reference to FIG. 9. The optical device 140 includes an actuator 150 constituted by a piezoelectric device 142 which is an electro-mechanical transducer that extends and contracts when a voltage is applied thereto, a weight 144 secured to one end of the piezoelectric device 142 in the direction of extension and contraction, a driving shaft 146 secured to the other end portion of the piezoelectric device 142 in the direction of extension and contraction, and a single movable member (optical member) 148 which engages with the driving shaft 146 with a predetermined frictional force, wherein the movable member 148 is moved along the driving shaft 146 when the piezoelectric device 142 extends or contracts to displace the driving shaft 146.

The movable member 148 holds a single movable lens (functional portion) 152 having an optical axis.

The driving shaft 146 includes a first straight portion 146a which straightly extends by a predetermined distance from the piezoelectric device 142 in the direction of the optical axis, a second straight portion 146b which is displaced from the first straight portion 146a through a smooth curved portion 147a and is straightly extended therefrom by a predetermined distance in the direction of the optical axis, and a third straight portion 146c which is displaced from the second straight portion 146b through a smooth curved portion 147b and is straightly extended therefrom by a predetermined distance in the direction of the optical axis. In the optical device 40, the driving shaft 140 also serves as a guide member for guiding the movable member 148.

Then, the operation of the optical device 140 configured as described above will be described. The principle of the driving of the movable member 148 using the actuator 150 is identical to that using the actuator 8 according to the first embodiment and redundant description thereof will be omitted.

A laser device 154 can generate, for example, three laser light rays L1, L2 and L3 having different wavelengths in parallel with one another from different positions. When the laser light ray L1 is generated therefrom, the movable member 148 is driven and positioned while being guiding by the first straight portion 146a of the driving shaft 146. Thus, the laser light ray L1 is brought into coincidence with the optical axis of the movable lens 152.

When the laser light ray L2 is generated, the movable member 148 is driven and positioned while being guided by the second straight portion 146b of the driving shaft 146. Thus, the laser light ray L2 is brought into coincidence with the optical axis of the movable lens 152.

When the laser light L3 is generated, the movable member 148 is driven and positioned while being guided by the third straight portion 146c of the driving shaft 146. Thus, the laser light ray L3 is brought into coincidence with the optical axis of the movable lens 152.

As described above, with the optical device 140 according to the present embodiment, since the driving shaft 146 serving as a guide member is used to guide the movable member 148 which is an optical member for bringing the optical axis of the single movable lens 152 provided on the movable member 148 into coincidence with the plural light rays, aberration corrections can be always performed with high accuracy at the position of the optical axis of the movable lens 152 for the plural light rays having different wavelengths. Further, the driving shaft of a conventional actuator may be utilized as a guide member, thus involving no cost increase.

Further, the actuator according to the present invention is not limited to an actuator employing an electro-mechanical transducer and may be an actuator which rotates, using a motor, the driving shaft which is coupled to the movable member through a ball screw mechanism.

The optical devices according to the present invention are not limited to the utilization for optical pickup devices for CDs and DVDs and may be, for example, used for other applications such as switching among zooming lenses in accordance with the magnification in a camera.

The optical device according to the present invention is not limited to those according the aforementioned embodiments and it is apparent that various variations and modifications may be made without departing from the spirit of the present invention. Particularly, the functional portions and the guide member are arbitrary and the actuators are merely illustrative.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An optical device comprising: an optical member having plural optical functional portions, each optical functional portion having an optical axis that is apart from an other optical functional portion in a direction perpendicular to an optical axis of the optical device; an actuator for driving the optical member in the direction of the optical axis of the optical device; and a guide member for guiding the optical member, wherein, when the actuator drives the optical member in the direction of the optical axis of the optical device, the respective optical axes of the plural optical functional portions of the optical member are alternatively set on the optical axis of the optical device through the guiding with the guide member.

2. An optical device of claim 1, wherein the optical member is rotatably held around the guide member and the plural functional portions are placed along an arc.

3. An optical device of claim 1, wherein the optical member includes plural lenses arranged on a plate member.

4. An optical device of claim 1, wherein the plural functional portions are in a single optical member having respective optical axes and different functions.

5. An optical device of claim 1, wherein the plural functional portions are in plural optical members having respective optical axes and different functions.

6. An optical device of claim 1, wherein the plural functional portions are plural aberration-correcting members suitable for different wavelengths.

7. An optical device of claim 1, wherein the plural functional portions are plural wavefront-correcting members suitable for different objects.

8. An optical device of claim 1, further comprising another actuator for driving the guide member in a direction substantially perpendicular to the optical axis of the optical device.

9. An optical device of claim 1, wherein the guide member includes a plurality of discontinuous portions thereof and, within the driving range of the optical member, the guiding of the optical member by the guide member is released at the position associated with one of said guide member portions and, at a second position, is engaged with another one of said guide member portions.

10. An optical device of claim 1, wherein the actuator includes:
   a driving shaft,
   an electro-mechanical transducer which extends or contracts when a voltage is applied thereto,
   the electro-mechanical transducer being secured to the end portion of the driving shaft at its one end in the direction of extension and contraction, and
   a movable member which is engaged with the driving shaft with a frictional force,
   wherein the movable member is moved along the driving shaft when the electro-mechanical transducer extends or contracts to displace the driving shaft.

11. An optical device of claim 10, wherein the plural functional portions are placed along an arc centered on the driving shaft.

12. An optical device of claim 10, wherein the driving shaft serves as the guide member.

* * * * *

UNITED STATES PATENT AND TRADEMARK OFFICE
CERTIFICATE OF CORRECTION

| | | |
|---|---|---|
| PATENT NO. | : 7,616,391 B2 | Page 1 of 1 |
| APPLICATION NO. | : 11/225774 | |
| DATED | : November 10, 2009 | |
| INVENTOR(S) | : Shinke et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 366 days.

Signed and Sealed this

Nineteenth Day of October, 2010

David J. Kappos
*Director of the United States Patent and Trademark Office*